(No Model.)

R. PARKER.
PAPER WEIGHT.

No. 429,863. Patented June 10, 1890.

Witnesses:—
D. H. Haywood
O. Lundgren

Inventor:—
Russell Parker
by his attorneys
Brown & Griswold

THE NORRIS PETERS CO., PHOTO-LITHO., WASHINGTON, D. C.

UNITED STATES PATENT OFFICE.

RUSSELL PARKER, OF BROOKLYN, NEW YORK.

PAPER-WEIGHT.

SPECIFICATION forming part of Letters Patent No. 429,863, dated June 10, 1890.

Application filed January 28, 1890. Serial No. 338,385. (No model.)

*To all whom it may concern:*

Be it known that I, RUSSELL PARKER, of Brooklyn, in the county of Kings and State of New York, have invented a certain new and useful Improvement in Paper-Weights, of which the following is a specification.

I will describe in detail a paper-weight embodying my improvement, and then point out the novel features in the claim.

Figure 1:
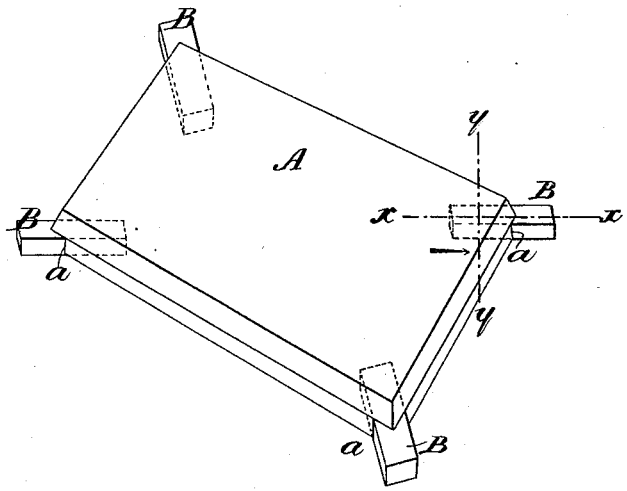
Figure 2:
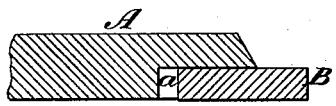
Figure 3:
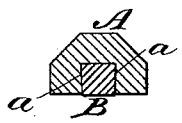

In the accompanying drawings, Figure 1 is a perspective plan view of a paper-weight embodying my improvement. Fig. 2 is a section, on an enlarged scale, taken on the line $x\ x$, Fig. 1. Fig. 3 is a section of one corner of the weight, taken on the line $y\ y$, Fig. 1, and looking in the direction of the arrow in said figure.

Similar letters of reference designate corresponding parts in all the figures.

In carrying out my improvement I take a paper-weight, which may be of any suitable material—such, for instance, as glass—and cast or otherwise form in the same one or more recesses, in which I insert a portion or portions of india-rubber.

The shape of the weight is rectangular.

A designates the paper-weight. At the corners of the paper-weight are recesses $a$. In the example shown these recesses are angularly shaped.

B designates blocks or pieces of india-rubber, which in the present instance are angular or wedge-shaped, the shape conforming substantially to the shape of the recesses $a$. The size of the rubber pieces B at the portions thereof which are received within the recesses is somewhat greater than the width of the recesses, the consequence being that when the pieces of rubber are introduced into the recesses it will be necessary to somewhat squeeze the rubber, and there will be a tight fit of the rubber within the recesses. When the rubber pieces or blocks B are of wedge shape and the recesses $a$ are of corresponding shape, as described, the said pieces or blocks are held in the recesses by means of their inherent expansion and the frictional resistance offered by the walls of the recesses $a$. The said pieces or blocks B may, however, be secured in the recesses by suitable cement.

It will be seen that by my improvement I provide a paper-weight which, when resting upon paper or any other surface, is held against accidental displacement by the rubber pieces B. It will also be seen that the rubber pieces B may be employed as erasers.

What I claim as my invention, and desire to secure by Letters Patent, is—

The herein-described paper-weight, consisting of a body portion A, provided with grooves extending outwardly from its under face, and blocks of rubber held securely in said grooves and projecting outwardly and downwardly beyond the faces of the body, substantially as specified.

RUSSELL PARKER.

Witnesses:
 FREDK. HAYNES,
 GEORGE BARRY.